(12) United States Patent
Brady, Jr. et al.

(10) Patent No.: US 8,116,797 B2
(45) Date of Patent: Feb. 14, 2012

(54) SYSTEM AND METHOD FOR WIRELESSLY TRANSFERRING CONTENT TO AND FROM AN AIRCRAFT

(75) Inventors: Kenneth A. Brady, Jr., Trabuco Canyon, CA (US); Dan Reed, Skyforest, CA (US); Bradley Foreman, Mission Viejo, CA (US); Wladyslaw Jan Buga, Rancho Santa Fe, CA (US); Tracy Raymond Trent, San Diego, CA (US)

(73) Assignees: Thales Avionics, Inc., Irvine, CA (US); Proximetry, Inc., San Diego, CA (US)

( * ) Notice: Subject to any disclaimer, the term of this patent is extended or adjusted under 35 U.S.C. 154(b) by 222 days.

(21) Appl. No.: 12/343,662

(22) Filed: Dec. 24, 2008

(65) Prior Publication Data
US 2011/0028178 A1 Feb. 3, 2011

Related U.S. Application Data

(63) Continuation of application No. 11/901,074, filed on Sep. 14, 2007, now Pat. No. 7,486,960.

(60) Provisional application No. 60/845,131, filed on Sep. 15, 2006.

(51) Int. Cl.
*H04Q 7/20* (2006.01)

(52) U.S. Cl. ....... 455/517; 455/500; 455/431; 455/3.01; 455/3.03; 455/414.1; 370/310; 370/328; 370/329; 370/315

(58) Field of Classification Search .................. 455/517, 455/500, 431, 3.01–3.06, 414.1–414.4, 466, 455/422.1, 403, 550.1; 370/310, 328, 329, 370/315
See application file for complete search history.

(56) References Cited

U.S. PATENT DOCUMENTS

| | | | |
|---|---|---|---|
| 6,181,990 B1 | 1/2001 | Grabowsky et al. | |
| 6,775,545 B2 | 8/2004 | Wright et al. | |
| 6,816,728 B2 | 11/2004 | Igloi et al. | |
| 6,901,064 B2 | 5/2005 | Cain et al. | |
| 6,904,032 B2 | 6/2005 | Cain | |
| 6,915,189 B2 | 7/2005 | Igloi et al. | |
| 6,954,449 B2 | 10/2005 | Cain et al. | |
| 6,958,986 B2 | 10/2005 | Cain | |
| 6,982,987 B2 | 1/2006 | Cain | |
| 7,027,409 B2 | 4/2006 | Cain | |
| 7,304,972 B2 | 12/2007 | Cain et al. | |
| 7,333,458 B2 | 2/2008 | Cain | |
| 2003/0045286 A1* | 3/2003 | Taylor | 455/431 |
| 2007/0042774 A1 | 2/2007 | Alcorn | |
| 2010/0224732 A1* | 9/2010 | Olson et al. | 244/190 |

\* cited by examiner

*Primary Examiner* — Keith Ferguson
(74) *Attorney, Agent, or Firm* — Myers Bigel Sibley & Sajovec, P.A.

(57) ABSTRACT

A system and method for wirelessly transferring content to and from a vehicle, in particular, an aircraft. The content includes, for example, data, voice, video and multimedia, that can be wirelessly exchanged over a wireless communication link between an aircraft and a ground station while the aircraft is at or near a parking gate, or between aircraft. In an example, the system employs long distance metropolitan area technology, such as IEEE Standard 802.16 wireless technology, to increase transfer range. The parameter of the wireless communication link can be adjusted based on, for example, the location of the link. The content can further be provided between the vehicle and ground station based on priorities, such as the available link speed, importance of the information, and/or anticipated connection time between the vehicle and ground station. A media creation center can be networked to a plurality of base stations.

16 Claims, 9 Drawing Sheets

SYSTEM AND METHOD FOR WIRELESSLY TRANSFERRING CONTENT TO AND FROM AN AIRCRAFT

CROSS-REFERENCE TO RELATED PATENT APPLICATION

This application is a continuation of U.S. patent application Ser. No. 11/901,074, filed Sep. 14, 2007, and claims benefit from U.S. Provisional Application No. 60/845,131, filed on Sep. 15, 2006, the entire contents of both are incorporated herein by reference.

BACKGROUND OF THE INVENTION

1. Field of the Invention

The present invention relates to a system and method for the wireless transfer of content to and from an aircraft. More particularly, the present invention relates to a system and method for wirelessly transferring content including, for example, data, voice, video and multimedia, between an aircraft and a ground station while the aircraft is at or near a parking gate, or between other aircraft.

2. Description of the Related Art

Many systems provide for use of up-to-date content on an aircraft by delivering portable entertainment media, such as videotape or digital versatile disc (DVD) to the aircraft prior to take-off. This procedure, of course, requires the physical creation of a master, duplication for every aircraft to be fitted, distribution of appropriate quantities to airport locations, and timely transfer of tapes/disks onto the aircraft. This procedure, however, does not provide for delivery of other data to the aircraft or data from the aircraft. Also, this process is very labor intensive, slow to distribute, and does not support any airline or flight related data on or off of the aircraft.

Newer digital systems that use digital servers for content storage and distribution provide up-to-date content to the aircraft by secure electronic transfer of the master over the Internet, for example, to a facility at or near the airport. At this facility, the content can be copied onto media appropriate for the aircraft (CD, DVD, memory stick) on an as-required basis to meet aircraft arriving at the gate. The media is carried to the gate and installed into the system of the aircraft. This approach significantly reduces the time and expense of physically shipping media to the various airports. Although this process is much faster in delivery and redistributes the labor effort to the various airport locations, it still requires the physical delivery of devices (CD, DVD, memory stick) to the aircraft at the gate. While such a device could also be loaded with some airline data, the timing of making the device probably does not permit it to contain any flight related data, such as passenger manifest data. If a writable device such as a memory stick is used, the same device can be used to offload aircraft data for physical transfer to an airport ground facility. However, this process is generally very labor intensive.

An industry concept commonly called "Gatelink" has been discussed in the industry for years. This concept requires a network to be wired to each airport gate, and a wired or wireless connection between the gate and the aircraft. Early attempts used optical links (e.g., infrared links), and an industry standard was developed, but the resulting products were commercially unsuccessful. More recently, common wireless local area network standards (such as IEEE 802.11a/b/g) have been identified and included within new Avionics standards (ARINC 763). While this standard is more than 5 years old, few airports have permitted its incorporation into the airport infrastructure.

With the "Gatelink" approach, the aircraft is recognized by the network when it arrives at the gate. Flight related data can be transferred off of the aircraft to a server on the ground. Also, any material appropriate for the flight, including airline operations data, flight related data including a passenger manifest, and up-to-date content, can be loaded onto the aircraft. This is a far superior technical approach toward moving data on and off of the aircraft. However, the short range of wireless local area network protocols requires that the implementation involve modification of the airport facility all the way to the actual aircraft gate.

Broadband satellite communications can be used to exchange significant amounts of data between the flying aircraft and the ground. Performance of these systems varies between the lower speed satellite communications (SATCOM) based systems (X.25, Swift64 or BGAN) to the higher speed KU band systems (ConneXion, Row44). In general, these satellite links are limited to between 64 Kbps and 20 Mbps. This bandwidth must be shared by all users in a large geographical area. In addition, the current regulations on aircraft based KU Band service do not permit aircraft to ground transmission to occur while the aircraft is on the ground. A single channel would be shared by many different aircraft at many different airports.

Cellular networks can also be used to transfer information to and from an aircraft while it is on the ground, but the bandwidth supported by such networks is at least an order of magnitude less than what is required to load the target content.

BRIEF DESCRIPTION OF THE DRAWINGS

Objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
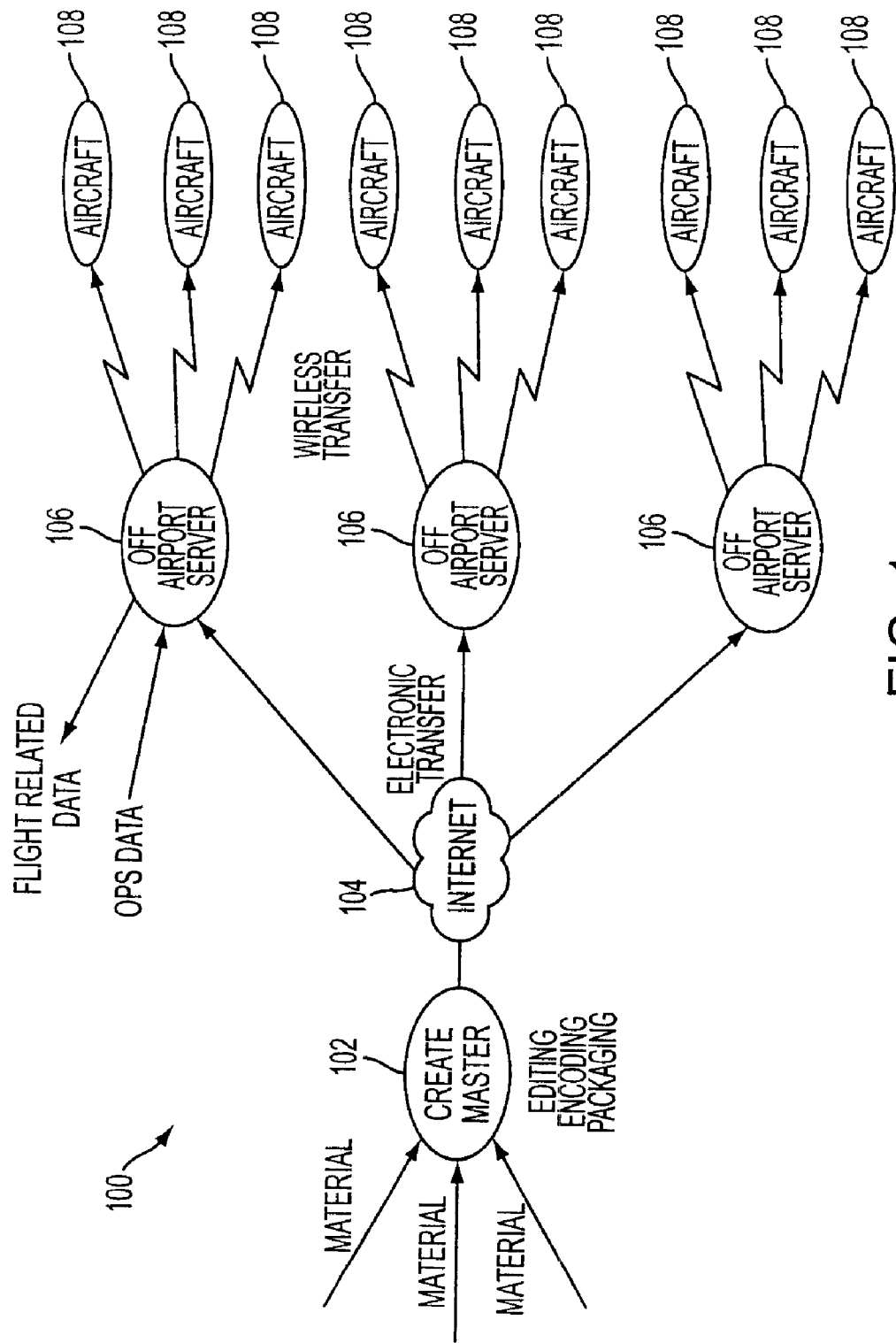
FIG. 1 is a conceptual diagram illustrating an example of a system for wirelessly transferring content to and from an aircraft according to an embodiment of the present invention.

As described in detail below, the present invention relates to a system and method for the wireless transfer of digital data from an aircraft to a ground station and from a ground station to the aircraft while the aircraft is at or near a parking gate. As shown in FIG. 1, an embodiment of the system 100 includes a media center 102 for creating a master file that is to be distributed. The media center 102 can be connected, for example, via the Internet 104 or any other type of network, to servers or base stations 106 that can be present, for example, at or proximate to airports. Servers or base stations 106 are each capable of wirelessly transmitting content to be received by transceivers on aircraft 108, for example. Specifically, the servers or base stations 106 utilize high-speed, long distance metropolitan area network technology (such as in accordance with IEEE Standard 802.16) instead of high-speed, local area technology (such as IEEE 802.11). The servers 106 therefore support real-time, or substantially real-time, transfer of information on and off of the aircraft 108. The servers 106 can operate without, or with minimal, modification to the airport facility, thus allowing the system 100 to be deployed with minimal cooperation from airport authorities.

As can be understood by one skilled in the art, the emerging Metropolitan Area Network standards, such as IEEE Standard 802.16, support high speed data transfer (e.g. within a range at or about 20 Mbps to at or about 70 Mbps) over a significant distance (e.g., within a range of at or about 3 miles to at or about 5 miles). Through a combination of a server/base-station, base-station transceiver, aircraft transceiver, aircraft antenna, and aircraft server, the system 100 can provide data transfer to/from the aircraft for the entire duration that it is at (or possibly near) the gate of the airport. With the addition of carefully located repeaters, the wireless network can surround an airport with service while minimizing any effect on the airport facility.

Any wireless technologies that support the wireless exchange of data across a distance within a range of about 3 to 5 miles can be used. As alternate technologies are developed they can be considered for use as well. Frequency selection could be determined by the base station 106 or by physical location of the aircraft 108, and high bandwidth is desirable.

It should also be noted that communication does not have to be restricted to information exchanged between the base station 106 and the aircraft 108. Rather, aircraft 108 can communicate directly each other with or without a base station. If one aircraft 108 has content a second aircraft 108 does not have, that content can be transferred aircraft to aircraft wirelessly or via a wire, fiber, etc., without an intermediate base station 106. Performance improvements may be possible by creating a mesh network of aircraft 108, base stations 106 and repeaters.

The content to be transferred to and from the aircraft 108 typically includes maintenance data, system performance data, system usage data, and transaction information. Data to be transferred to the aircraft typically includes content or media for In-Flight Entertainment (IFE), passenger data such as a manifest, and airline operational data such as airline memos, training, and procedure information. Of particular interest is the transfer of time sensitive content or media for IFE, since there is a strong desire to provide up-to-date news, weather, and sports content to an aircraft for use during the next flight.

Figure 2:
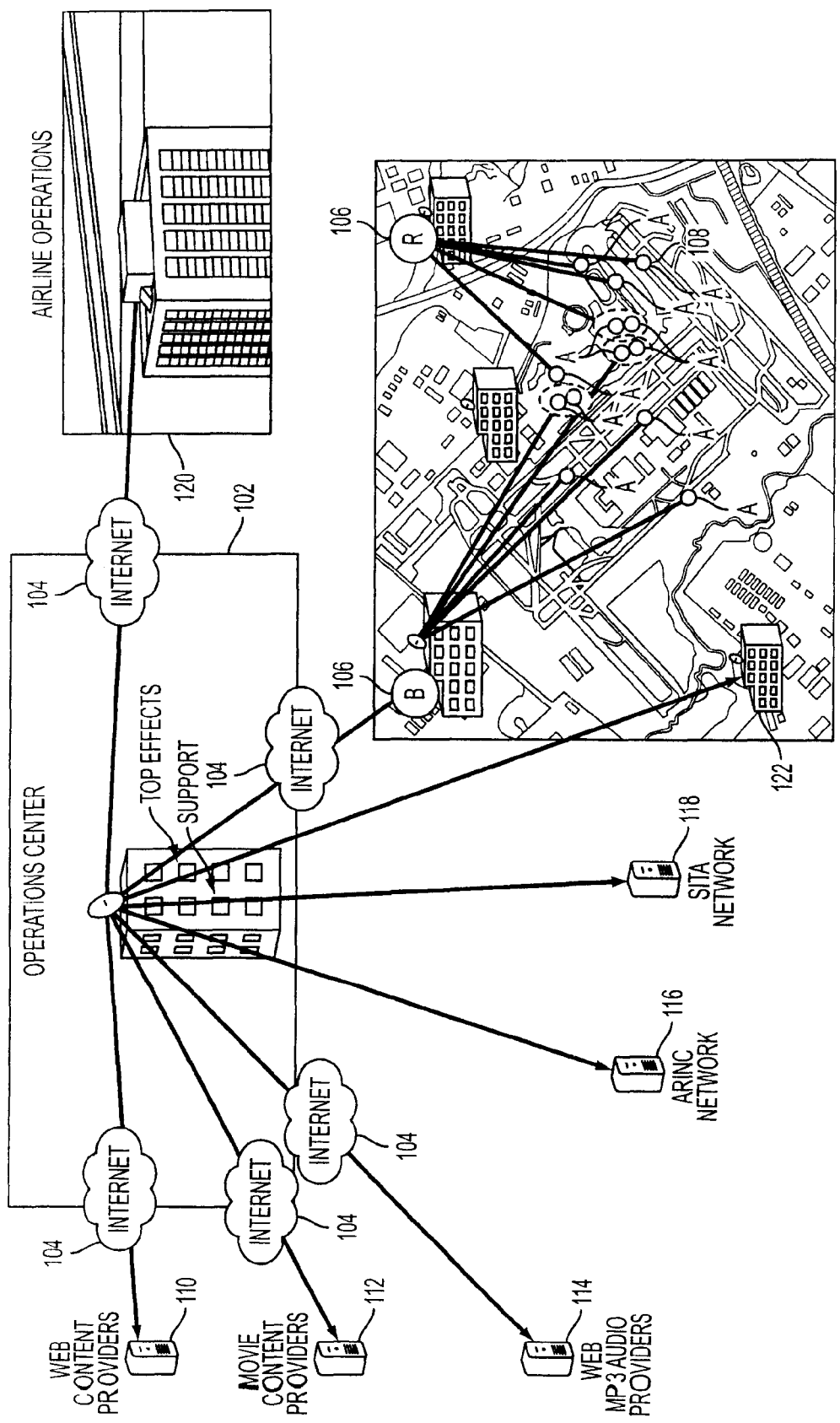
FIGS. 2-5 illustrate examples of content providers and examples of the relationship between the components of the system shown in FIG. 1.
Figure 3:
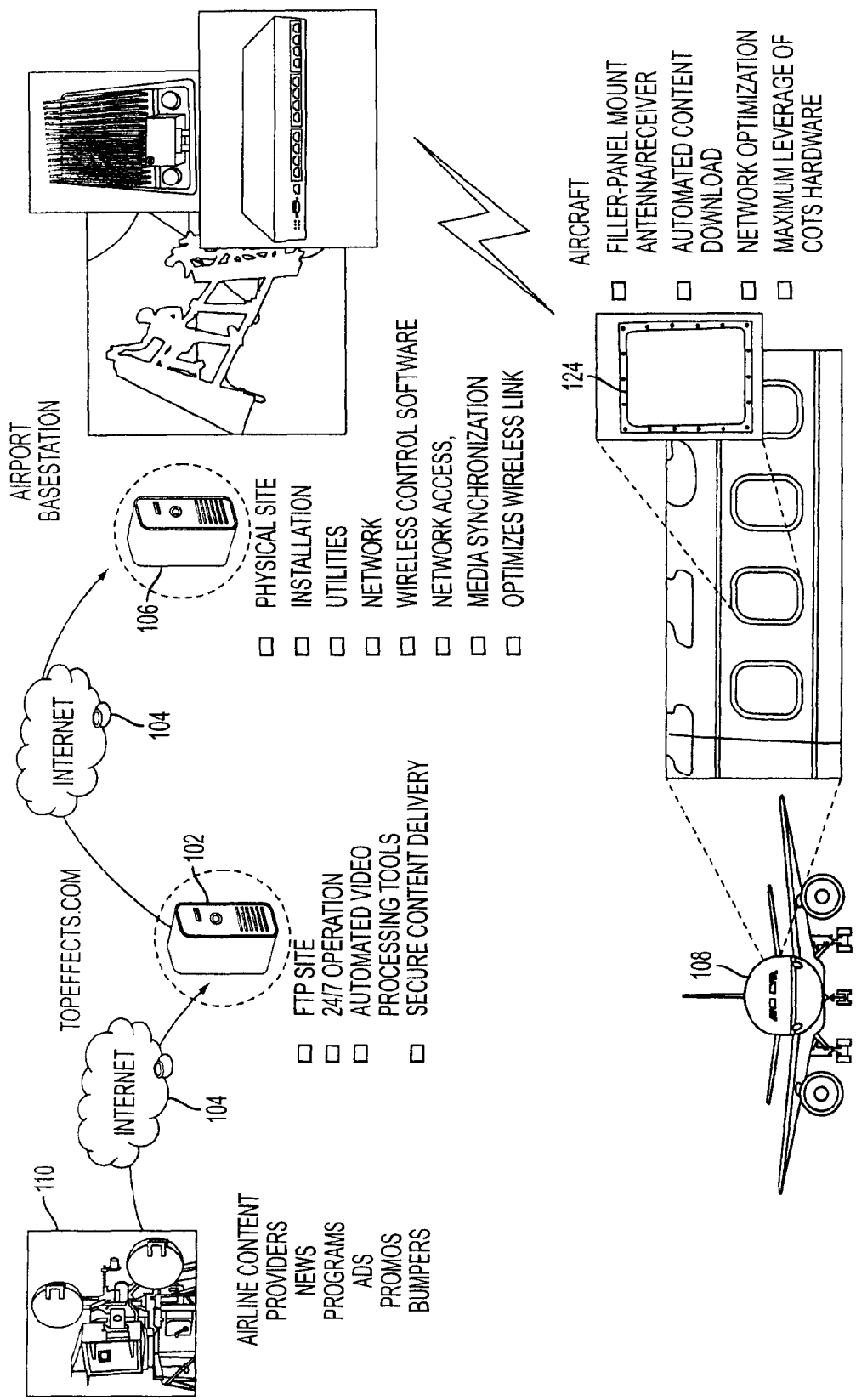

FIGS. 2-5 illustrate examples of content providers and examples of the relationship between the components of the system 100. As shown in FIG. 2, the operations center 102 can communicate with, and thus receive information from (or exchange information with) web content providers 110, movie content providers 112, web MP3 audio providers 114, Aeronautical Radio, Inc. (ARINC) providers 116, and Société Internationale de Télécommunications Aéronautiques (SITA) providers 118, to name a few, as well as an airline operations center 120 and an alternate server site 122. As shown in FIG. 3, in particular, the base station 106 in one example communicates with a filler-panel mount antenna/receiver 124 that is mounted in the aircraft 108.

Figure 4:
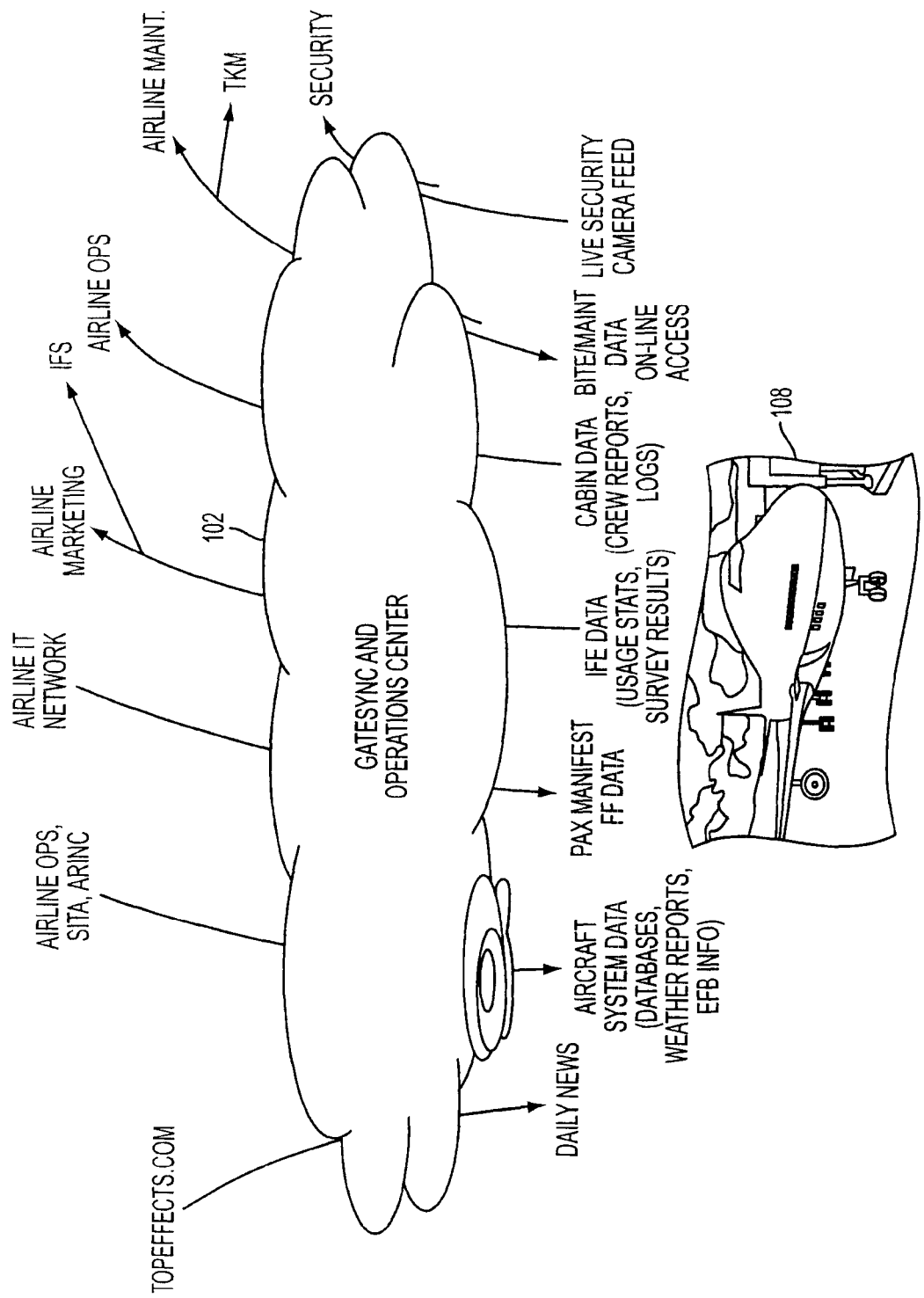
Figure 5:
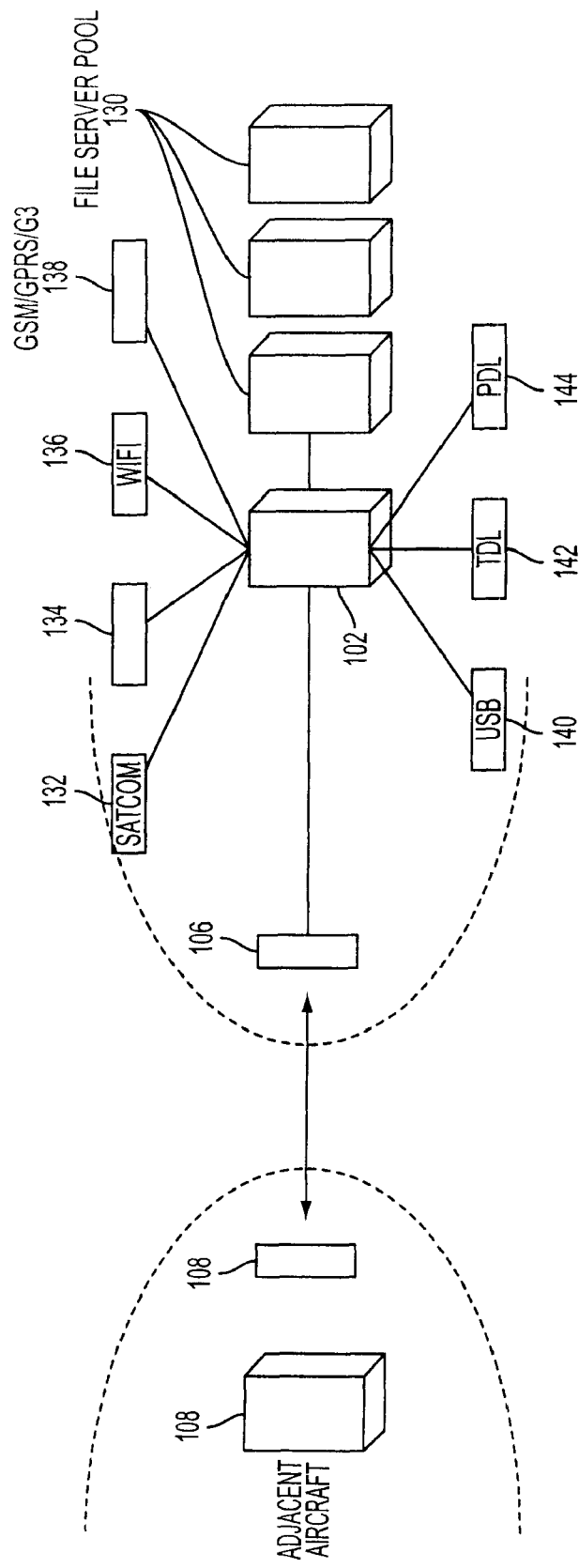

FIGS. 4 and 5 further illustrate the various types of content that can be exchanged between the operations center 102 and the aircraft 108, and the various types of components that can communicate with the operations center 102. FIG. 5, in particular, illustrates that the operations center 102 can communicate with a file server pool 130, a SATCOM network 132, a Worldwide Interoperability for Microwave Access (WiMAX) IEEE Standard 802.16 network 134, a wireless fidelity (WIFI) IEEE Standard 802.11a network 136, a global satellite for mobile/general packet radio service/G3 (GSM/GPRS/G3) network 138 (e.g., a cell phone technology network), a universal serial bus (USB) device 140 such as a memory stick, a top level domain (TDL) device 142 such as a removable hard drive loaded on board an aircraft, and a page description language (PDL) device 144 such as a portable loader carried on board an aircraft, to name a few. As stated above, the base station 106 provides for a real-time, high-speed data link on and off of the aircraft 108 that can be used while the aircraft 108 is on the ground, such that additional systems can be connected on both the aircraft side as well as the ground side. These systems can be used to exchange information such as security video, flight related information, and so on. The content can be loaded daily, monthly, or as frequently as desired.

As can be appreciated from FIGS. 3-5, for example, when a vehicle 108 such as an aircraft communicates with a server 106, the vehicle 108 will exchange identification information with the server so the server 106 will be able to identify the vehicle 108. The content that is provided to the vehicle 108 can then be based, at least in part, on the vehicle's identity. Also, software in the server 106, for example, the wireless control software (see FIG. 3), can operate to adjust the parameters of the wireless link between the server 106 and the vehicle 108 based on the location of the server 106 (i.e., the location of the link), so that the wireless link can conform to, for example, the wireless regulations governing communications in that location. For instance, some countries or areas of a country may require that wireless communication links comply with a particular standard different than those in other areas of the country or in other countries. Hence, the server 106 can include a location identification mechanism that can communicate with, for example, an external device (e.g., a GPS) so that the server 106 can identify its location, and the software can adjust the parameters of the link based on the assessed location. Likewise, the communication device on the vehicle 108 can include a mechanism, such as software and hardware, that can enable the communication device on the vehicle 108 to support the type of link established by the server 106.

In addition, the vehicle 108 can include a traffic prioritization mechanism embodied, for example, in its hardware and software, to prioritize the transfer of information from the vehicle 108 to the server 106 in accordance with, for example, the available link speed, importance of the information, and/or anticipated connection time with the server 106. Similarly, the server 106 can include a traffic prioritization mechanism embodied, for example, in its hardware and software, to prioritize the transfer of information from the server 106 to the vehicle 108 in accordance with, for example, the available link speed, importance of the information, and/or anticipated connection time with the vehicle 108.

Figure 6:
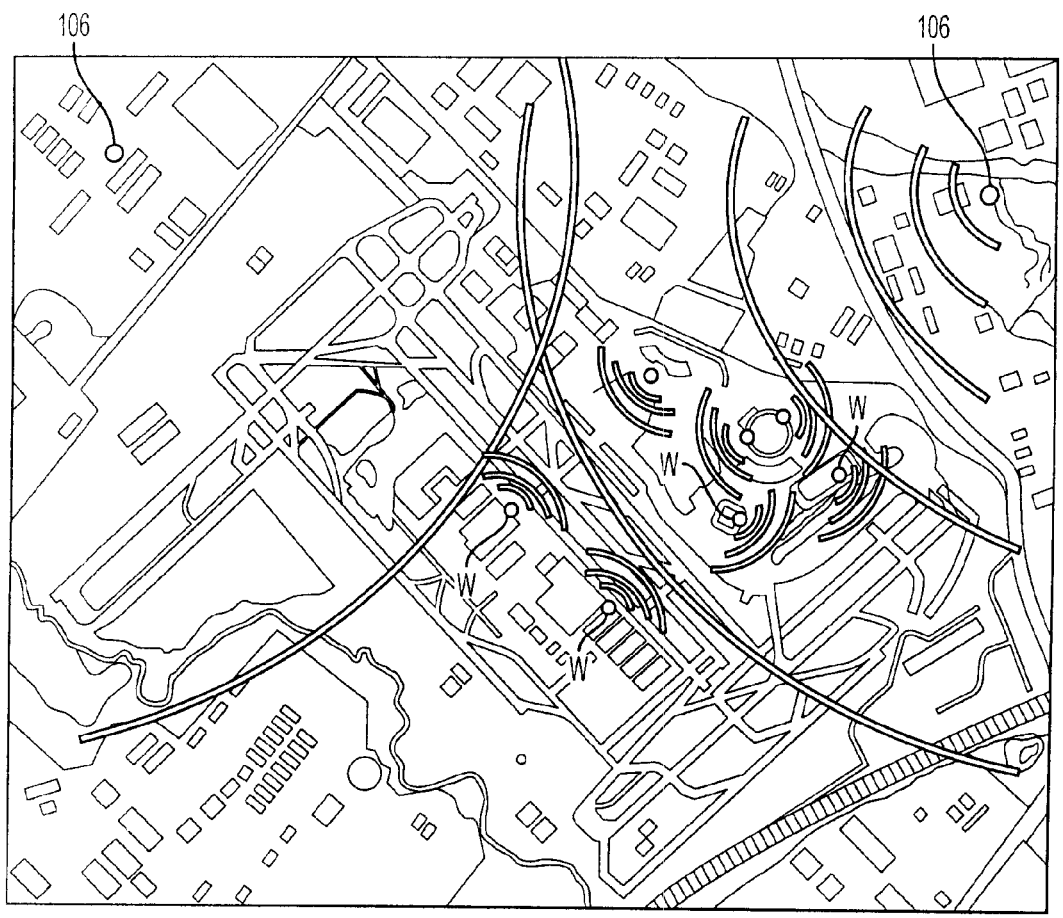
FIG. 6 is an aerial view illustrating an example of a broadcast range of the base stations of the system shown in FIG. 1 in relation to the broadcast range of WIFI type devices.
Figure 7:
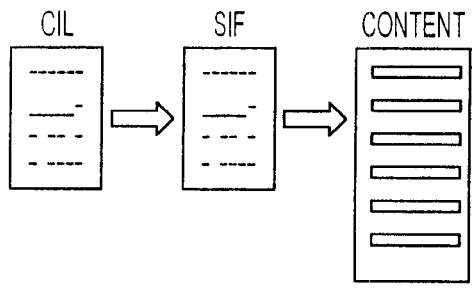
FIG. 7 illustrates one example of the manner in which content is provided to the system shown in FIG. 1.
Figure 8:
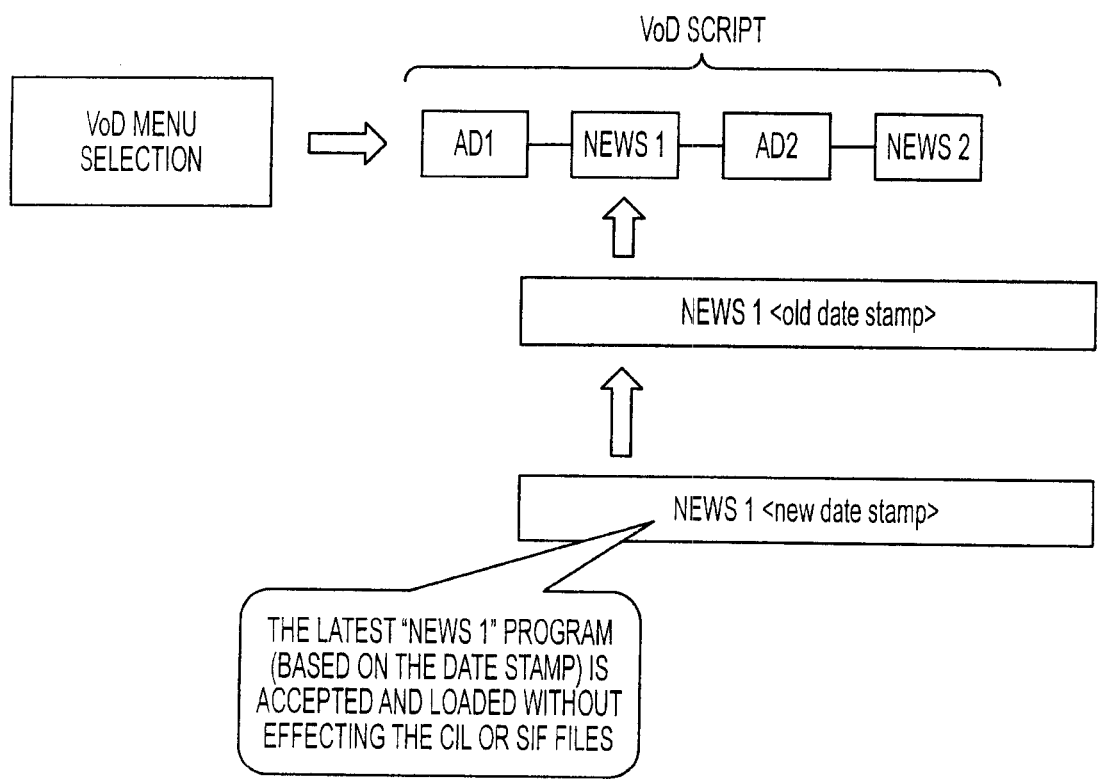
FIG. 8 illustrates an example in which video on demand (VoD) technology is used to provide content to the system shown in FIG. 1.
Figure 9:
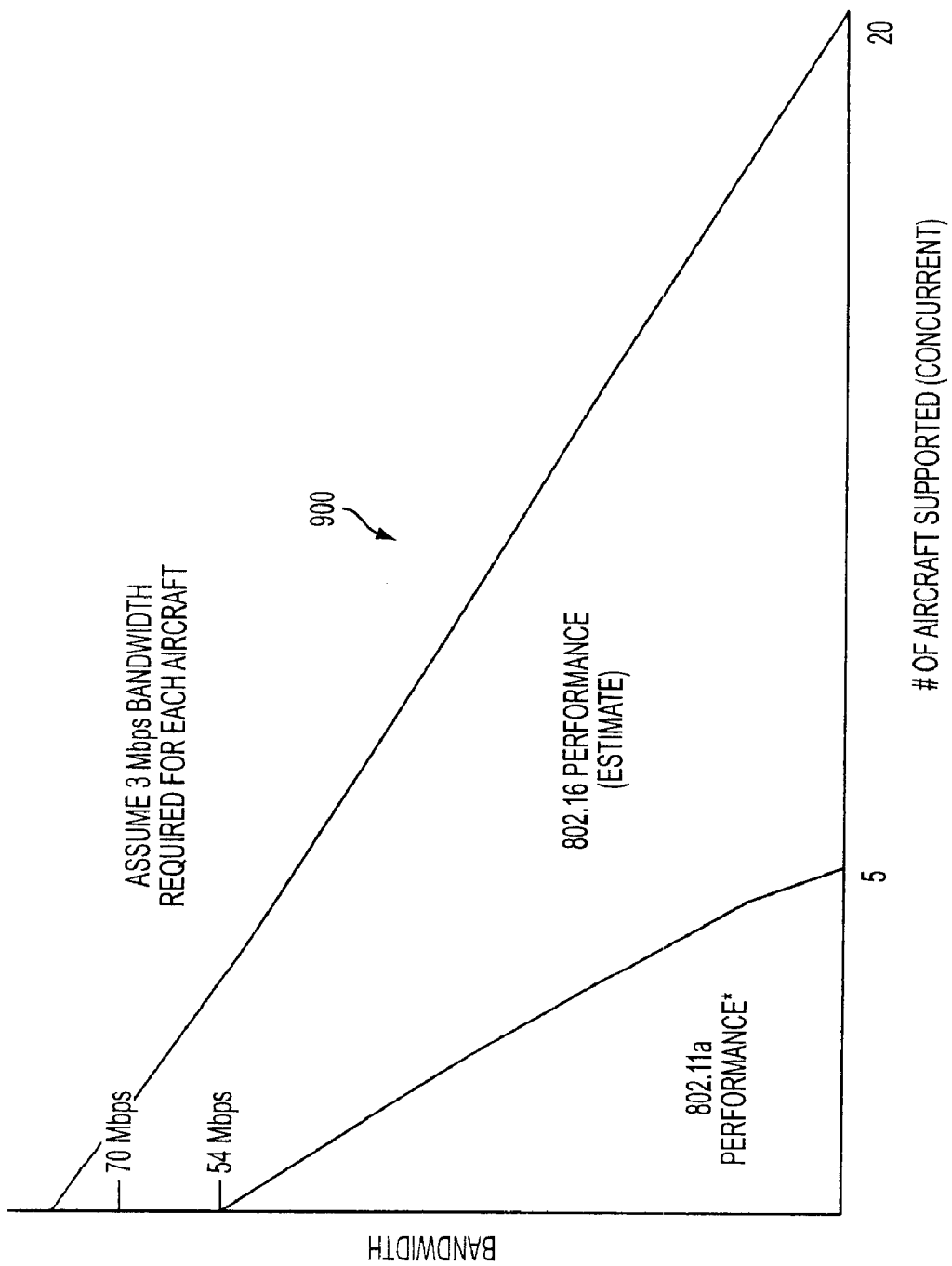
FIG. 9 is a graph illustrating an example of the performance of an IEEE Standard 802.16 system as employed in the system shown in FIG. 1 compared to an IEEE Standard 802.11a system.
Figure 10:
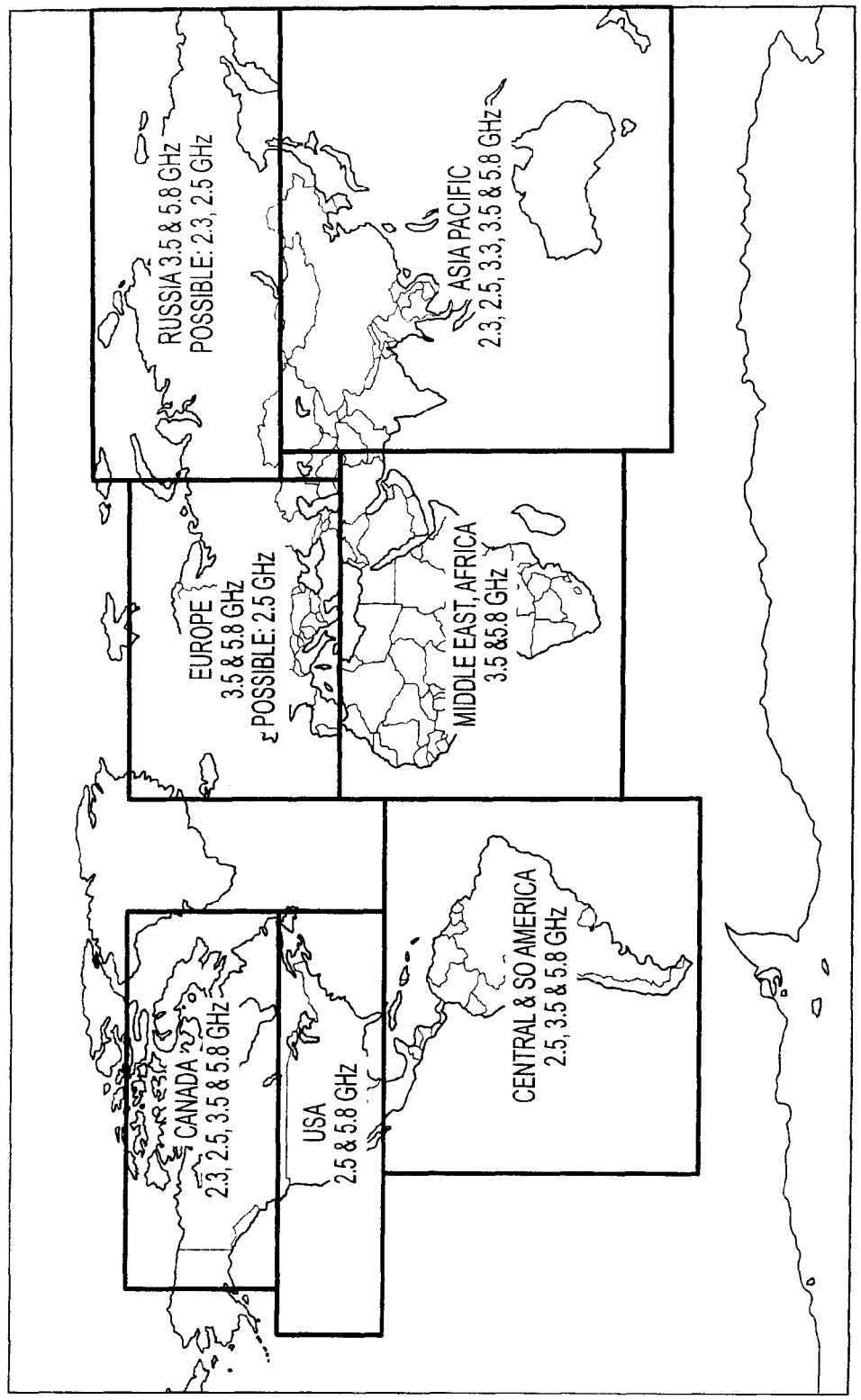
FIG. 10 illustrates an example of the different frequencies that can be used for the wireless links between the base stations of the system shown in FIG. 1 and aircraft in various locations around the world.

FIG. 6 is an aerial view illustrating an example of a broadcast range of the base stations 106 in relation to the broadcast range of WIFI type devices W. FIG. 7 illustrates one example of the manner in which content is provided. For instance, a common intermediate language (CIL) file can be converted into a standard input format (SIF) file and thus provided as the content. In another example, as shown in FIG. 8, a video on demand (VoD) menu can be used to provide the content, with the date stamps of the content (e.g., news 1) being updated as the content is updated. FIG. 9 is a graph 900 illustrating an example of the performance of an IEEE Standard 802.16 system as employed in the system 100, compared to an IEEE Standard 802.11a system. FIG. 10 illustrates an example of the different frequencies that can be used for the wireless links between the base stations 106 and aircraft 108 in various locations around the world.

Although only a few exemplary embodiments of the present invention have been described in detail above, those skilled in the art will readily appreciate that many modifications are possible in the exemplary embodiments without materially departing from the novel teachings and advantages of this invention. For example, the order and functionality of the steps shown in the processes may be modified in some respects without departing from the spirit of the present invention. Accordingly, all such modifications are intended to be included within the scope of this invention as defined in the following claims.

What is claimed is:

1. A system for delivering media content between a plurality of vehicles, a plurality of base stations, and a media creation center, the system comprising:
   a first communication device disposed at each of the vehicles;
   a second communication device disposed at each of the base stations; and
   a third communication device, disposed at the media creation center;
   the third communication device having a network interface to the second communication devices of the plurality of base stations to deliver created media content over a network to the base stations;
   the first and second communication devices employing wireless metropolitan area network technology to establish a link to communicate the media content between each other, and further employing a link parameter adjustment mechanism to adjust at least one parameter of the link based on a location of the link;
   wherein a first communication device of a first vehicle communicates the media content directly, and without a base station, to a first communication device of a second vehicle over a communication link exceeding 20 Mbps.

2. A system as claimed in claim 1, wherein:
   the vehicle is an aircraft.

3. A system as claimed in claim 1, wherein:
   the entity is a base station at an airport.

4. A system as claimed in claim 1, wherein:
   the first and second communication devices are operable to exchange identification information pertaining to the vehicle.

5. A system as claimed in claim 4, wherein:
   the content is based on the identity of the vehicle.

6. The system as claimed in claim 1, wherein:
   a first communication device of a first vehicle forms a mesh network with a first communication device of a second vehicle and communicates the created media content thereto.

7. The system as claimed in claim 1, wherein:
   forming a mesh network between a first communication device of a first vehicle and a first communication device of a second vehicle and communicating the created media content between the first and second vehicle.

8. The system as claimed in claim 1, wherein the first communication device of the first vehicle determines if the vehicle associated with the other first communication device or an entity associated with a second communication device is missing any content possessed by the first vehicle, and then transfers the missing content to the other first communication device or the second communication device.

9. A method for delivering media content between a plurality of vehicles, a plurality of base stations, and a media creation center, the method comprising:
   providing a first communication device at each of the vehicles;
   providing a second communication device at each of the base stations;
   providing a third communication device at the media creation center;
   creating media content at the media creation center;
   transmitting the media content over a network to each of the plurality of second communication devices at the plurality of base stations;
   establishing a link between the first and second communication devices utilizing wireless metropolitan area network technology to communicate the media content between each other;
   adjusting at least one parameter of the link based on a location of the link; and
   communicating media content from a first communication device of a first vehicle directly, and without a base station, to a first communication device of a second vehicle, over a communication link exceeding 20 Mbps.

10. A method as claimed in claim 9, wherein:
    the vehicle is an aircraft.

11. A method as claimed in claim 9, wherein:
    the entity is a base station at an airport.

12. A method as claimed in claim 9, further comprising:
    operating the first and second communication devices to exchange identification information pertaining to the vehicle.

13. A method as claimed in claim 12, wherein:
    the content is based on the identity of the vehicle.

14. A method as claimed in claim 9, comprising:
    providing content from an operations center over a network to the entity.

15. A method as claimed in claim 9, further comprising:
    providing a plurality of said second communication devices, each disposed at a respective locations proximate to a respective entity within the device's respective wireless transmission range.

16. The method as claimed in claim 9, further comprising:
    determining if the vehicle associated with the other first communication device or an entity associated with a second communication device is missing any content possessed by the first vehicle; and
    transferring the missing content to the other first communication device or the second communication device.

* * * * *